US009317599B2

(12) United States Patent
You

(10) Patent No.: US 9,317,599 B2
(45) Date of Patent: Apr. 19, 2016

(54) METHOD, APPARATUS AND COMPUTER PROGRAM PRODUCT FOR PROVIDING RELEVANCE INDICATION

(75) Inventor: Yu You, Kangasala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1330 days.

(21) Appl. No.: 12/234,066

(22) Filed: Sep. 19, 2008

(65) Prior Publication Data

US 2010/0083131 A1    Apr. 1, 2010

(51) Int. Cl.
*G06F 7/00* (2006.01)
*G06F 17/30* (2006.01)

(52) U.S. Cl.
CPC ................... *G06F 17/30861* (2013.01)

(58) Field of Classification Search
CPC .............. G06F 17/30861; G06F 17/30696; G06F 17/30864
See application file for complete search history.

(56) References Cited

U.S. PATENT DOCUMENTS

| | | | | |
|---|---|---|---|---|
| 4,271,731 A * | 6/1981 | Suligoy et al. | | 81/177.7 |
| 5,321,833 A * | 6/1994 | Chang et al. | | |
| 5,515,506 A * | 5/1996 | Dixon | | 714/42 |
| 5,625,767 A * | 4/1997 | Bartell et al. | | 345/440 |
| 5,642,502 A * | 6/1997 | Driscoll | | |
| 5,659,544 A * | 8/1997 | La Porta et al. | | 370/312 |
| 5,890,684 A * | 4/1999 | Stewart | | F16L 3/23 174/40 CC |
| 5,924,090 A * | 7/1999 | Krellenstein | | |
| 5,987,446 A * | 11/1999 | Corey et al. | | |
| 6,012,053 A * | 1/2000 | Pant | | G06F 17/30696 |
| 6,211,847 B1 * | 4/2001 | Jeong | | G06F 3/153 345/1.1 |
| 6,963,867 B2 * | 11/2005 | Ford et al. | | 707/752 |
| 7,203,675 B1 * | 4/2007 | Papierniak | | G06F 17/30861 707/600 |
| 7,630,986 B1 * | 12/2009 | Herz | | G06Q 10/10 |
| 7,685,209 B1 * | 3/2010 | Norton | | G06F 17/30997 707/803 |
| 8,346,765 B2 * | 1/2013 | Guo et al. | | 707/723 |
| 8,645,390 B1 * | 2/2014 | Oztekin | | G06F 17/30867 707/721 |
| 2001/0042060 A1 * | 11/2001 | Rouse | | G06F 17/30274 |
| 2002/0162756 A1 * | 11/2002 | Seligman et al. | | 206/0.82 |
| 2003/0069873 A1 * | 4/2003 | Fox et al. | | 707/1 |
| 2005/0086300 A1 * | 4/2005 | Yeager et al. | | 709/204 |
| 2005/0091292 A1 * | 4/2005 | Pai | | G06F 15/025 708/160 |
| 2007/0102131 A1 * | 5/2007 | Raffle | | B22D 17/2218 164/121 |

(Continued)

FOREIGN PATENT DOCUMENTS

| | | |
|---|---|---|
| CN | 1816812 A | 8/2006 |
| WO | 2004111771 A2 | 12/2004 |
| WO | WO 2007/124429 A2 | 11/2007 |

OTHER PUBLICATIONS

Wang et al., "Ranking User's Relevance to a Topic Through Link Analysis on Web Logs", ACM 2002.*

(Continued)

*Primary Examiner* — Daniel Kuddus
(74) *Attorney, Agent, or Firm* — Ditthavong & Steiner, P.C.

(57) ABSTRACT

An apparatus for providing relevance indication may include a processor. The processor may be configured to identify tags associated with a place. In this regard, the place may be a virtual location where information is shared. The processor may be configured to determine a relevance value for the place by analyzing the tags relative to user attributes. The processor may also be configured to provide for an output of a representation of the relevance value to a user interface. Associated methods and computer program products are also provided.

29 Claims, 6 Drawing Sheets

(56) References Cited

U.S. PATENT DOCUMENTS

| | | | |
|---|---|---|---|
| 2007/0288457 A1* | 12/2007 | Aravamudan et al. | 707/5 |
| 2008/0005751 A1* | 1/2008 | Chandra | 719/328 |
| 2008/0104032 A1* | 5/2008 | Sarkar | 707/3 |
| 2008/0170616 A1* | 7/2008 | Hwang et al. | 375/240.16 |
| 2009/0012991 A1* | 1/2009 | Johnson et al. | 707/103 R |
| 2009/0070295 A1* | 3/2009 | Otomori et al. | 707/3 |
| 2009/0150786 A1* | 6/2009 | Brown | 715/733 |
| 2009/0240680 A1* | 9/2009 | Tankovich | G06F 17/3053 |
| 2009/0288457 A1* | 11/2009 | Moldal | 70/158 |
| 2009/0327224 A1* | 12/2009 | White et al. | 707/3 |
| 2010/0030894 A1* | 2/2010 | Cancel | G06Q 30/02 709/224 |
| 2010/0067752 A1* | 3/2010 | Vestgote | 382/125 |
| 2012/0095837 A1* | 4/2012 | Bharat et al. | 705/14.54 |

OTHER PUBLICATIONS

Ahlberg et al, "Dynamic Queries for Information Exploration: An Implementation and Evaluation"; ACM 1992.*

European Search Report for corresponding EP Application No. 09169110.5-2201, Oct. 7, 2009, Europe.

Gonzalez et al., "Managing currents of work: Multi-tasking among multiple collaborations," *Department of Informatics, University of California*.

Chinese Office Action for related Chinese Application No. 200910171916.2 dated Mar. 16, 2012, pp. 1-11.

Office Action for related Chinese Patent Application No. 200910171916.2 dated Nov. 21, 2012, pp. 1-7.

Rejection Decision for related Chinese Application No. 200910171916.2, dated Jun. 6, 2013, 7 pages.

* cited by examiner

METHOD, APPARATUS AND COMPUTER PROGRAM PRODUCT FOR PROVIDING RELEVANCE INDICATION

TECHNICAL FIELD

Embodiments of the present invention relate generally to information sharing and, more particularly, relate to an apparatus, method and a computer program product for providing an indication of the relevance of shared information.

BACKGROUND

As communications technology has evolved over the past decades, business and social environments have begun utilizing a number of applications to share information. These information sharing applications, such as, but not limited to email, chat rooms, other forms of text messaging, file sharing (e.g., document sharing, audio file sharing, photo sharing, video sharing), and collaborative document editing, have become ubiquitous in many business and social settings. Users have found these applications to be fast, reliable, and affordable means for sharing information. In particular, these applications have been quite useful in situations where numerous individuals are sharing information, and participating individuals are located at different geographic locations.

With an array of options for sharing information at a user's disposal, many users have begun to multitask with respect to information sharing. In this regard, a single user may participate, or at least be available to participate, in a variety of information sharing mechanisms simultaneously. For example, in social settings it has become common for a user to be present in multiple chat rooms simultaneously and interact with different individuals in each chat room with regard to different topics. As another example, an individual may be present in a chat room that may be tied to a collaboratively edited document such that the members in the chat room may communicate as changes are being made to the document, and meanwhile the same individual may be present in a screen sharing session directed to a different topic, where an interactive presentation is being performed. By multitasking in this manner a user may be able to efficiently interact with multiple individuals at various geographic locations simultaneously with regard to different topics.

However, in order to multitask in this manner, an individual may need to consistently monitor numerous information sharing applications, or instances of numerous information sharing applications, in which the user has a presence. Further, there may be times when the topic being discussed by members of a chat room or the portion of a document being collaboratively edited may not be of interest to a user. A user may be forced to monitor information that is not of interest to the user, to determine when information is being shared that would be of interest to the user. Monitoring information sharing applications in this manner may become quite tedious, and ultimately degrade the efficiencies that can be realized by being able to multitask.

BRIEF SUMMARY

A method, apparatus, and computer program product are described that provide for relevance indication and/or relevant activity indication. Exemplary embodiments of the present invention may identify tags associated with a place. The place may be a virtual location where information is shared. In some embodiments, one or more users may become associated with the place, or come to have a virtual presence at the place and become a member of the place after registering with the place, logging into the place, or the like. Various information sharing applications may be implemented in association with the place by the members of the place. The tags identified with respect to the place may be any information associated with the place. In some exemplary embodiments, the tags may be derived from content being shared amongst users associated with the place or meta-data associated with the content being shared. In some embodiments, the tags may be derived from semantics associated with activities occurring at the place.

Exemplary embodiments of the present invention may also determine a relevance value for the place by analyzing the tags relative to user attributes. In some exemplary embodiments, the user attributes may be associated with a specific user and may be derived from preferences or other user defined settings. By analyzing the tags relative to the user attributes, a relevance value can be determined that can provide an indication of how relevant the activities occurring at the place are with respect to the user.

Exemplary embodiments of the present invention may also provide for an output of a representation of the relevance value to a user interface. In some exemplary embodiments, the user interface may include a display, and embodiments of the present invention may be configured to transmit a representation of the relevance value to driver circuitry of the display. Outputting a representation of the relevance value may facilitate the ability of a user to quickly determine whether further investigation or other actions should be taken by the user with respect to the place.

One exemplary embodiment of the present invention may be a method for providing relevance indication. The method may include identifying tags associated with a place. In this regard, the place may be a virtual location where information is shared. The exemplary method may also include determining a relevance value for the place by analyzing the tags relative to user attributes, and providing for an output of a representation of the relevance value to a user interface.

Another exemplary embodiment of the present invention may be an apparatus for providing relevance indication. The apparatus may include a processor. The processor may be configured to identify tags associated with a place. In this regard, the place may be a virtual location where information is shared. The processor may also be configured to determine a relevance value for the place by analyzing the tags relative to user attributes, and configured to provide for an output of a representation of the relevance value to a user interface.

Yet another exemplary embodiment of the present invention may be a computer program product for providing relevance indication. The computer program product may comprise at least one computer-readable storage medium having executable computer-readable program code instructions stored therein. The computer-readable program code instructions may include first program code instructions configured to identify tags associated with a place. In this regard, the place may be a virtual location where information is shared. The computer program product may also include second program code instructions configured to determine a relevance value for the place by analyzing the tags relative to user attributes, and third program code instructions configured to provide for an output of a representation of the relevance value to a user interface.

Another exemplary embodiment of the present invention may be an apparatus for providing relevance indication. The apparatus may include means for identifying tags associated with a place. In this regard, the place may be a virtual location where information is shared. The apparatus may also include means for determining a relevance value for the place by analyzing the tags relative to user attributes, and means for providing for an output of a representation of the relevance value to a user interface.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
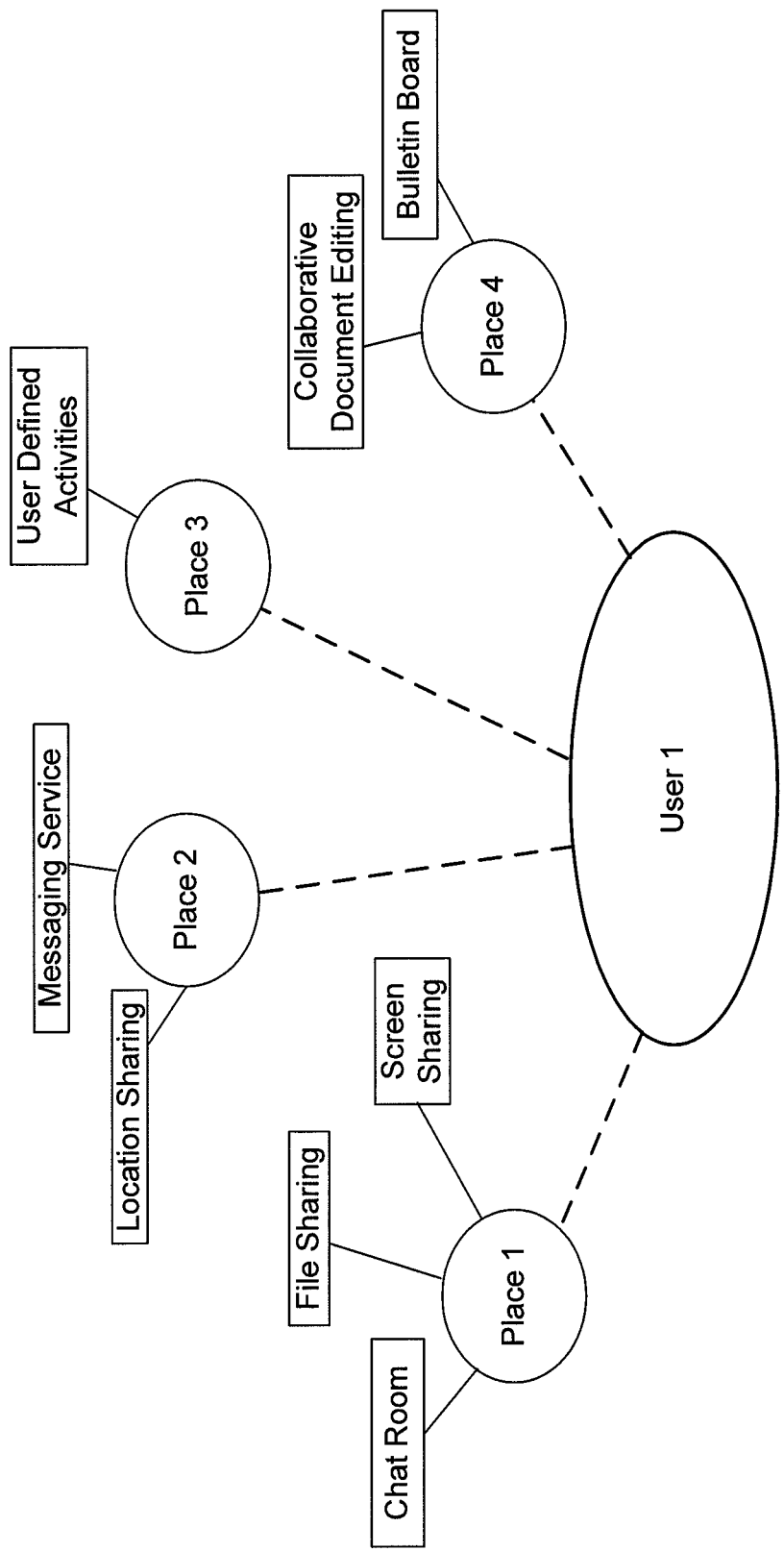
FIG. 1 illustrates an example virtual architecture of a user's presence at various places according to exemplary embodiments of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the term "exemplary," is not intended to convey any qualitative assessment, but instead to merely convey an illustration of an example.

FIG. 1 illustrates an example virtual architecture of a user's presence at various places according to exemplary embodiments of the present invention. The places of FIG. 1, namely, Place 1, Place 2, Place 3, and Place 4, may be virtual locations where information sharing can occur between users that have a presence at the places. A user that has a presence at a place may be defined as a member of the place. To become a member of a place, a user may register to the place, log into the place, or otherwise be associated with the place. For example, a place may be generated for a working group of a business. Individuals included within the working group may be identified and registered with the place as members. In some exemplary embodiments, the member may have an associated status, which may indicate whether the user is active, inactive, present, away, or the like. In another example, a social networking website may generate a place associated with a topic. Users of the social networking website that are interested in the topic may log into the place to become members of the place.

Referring to FIG. 1, User 1 is a member of Place 1, Place 2, Place 3, and Place 4. Although not depicted in FIG. 1, Place 1, Place 2, Place 3, and Place 4 include additional members that may be involved in activities such as information sharing at the places.

Each member of a place, such as, for example, User 1 of FIG. 1, may have associated user attributes. User attributes may be used to determine whether activities that are relevant to the user are being conducted at a place as further described below. User attributes may be defined any number of ways. For example, user attributes may be defined from data gathered from a member's user profile. In this regard, a user profile may include data such as, age, gender, occupation, membership in working groups, memberships in social groups, job description, business affiliations, social relationships, interests, hobbies, and the like. User attributes may also be derived from user defined preferences, which may be defined specific to a particular place, or may be defined across all places in which the user is a member. In some embodiments, user attributes may be derived from historical data about the past activities of a user that have been captured in association with the user, such as by the user's communication device, or by a network server that may be monitoring the user's activities. Historical information that may be used to derive user attributes may include, but is not limited to, the content of recently visited websites, the content of recently conducted searches, the content of recently drafted documents, the content of recent communications, the identities of individuals that the user has recently communicated with, recently purchased goods or services, recent event the user attended, recent real world locations the user has visited, or the like. In some exemplary embodiments, user attributes may be derived from the historical information that is stored in a history log located on the user's communication device or on a network server.

To facilitate information sharing between the members of a place, information sharing applications may be implemented in association with the place. A variety of information sharing applications may be implemented in association with a place as further described below. The information being shared by the information sharing applications may be referred to as content, where content includes, but is not limited to, textual communications (e.g., instant messages, chat room messages, SMS messages, MMS messages, etc.), files (e.g., documents, data compilations, spreadsheets, presentations, audio files, photos, videos, etc.), status information of members (e.g., active status, inactive status, etc.), data describing the locations of members or landmarks, scheduling information, and the like. In some exemplary embodiments of the present invention, multiple information sharing applications, possibly of the same type, may be implemented simultaneously with respect to a place.

In some exemplary embodiments, information sharing applications may include applications capable of sharing near-real time content amongst members of a place. In this regard, chat rooms, instant messaging, messaging service (e.g., simple message service (SMS), multimedia message service (MMS), screen sharing, voice conferencing, video webcam sharing, or the like may be utilized as information sharing applications.

These and other types of applications may be utilized to share information, which may, or may not, entail near-real time communications. For example, file sharing, location sharing, collaborative document editing, bulletin boards, or the like may also be implemented as information sharing applications with respect to a place. In this regard, a location sharing application may receive location content from members' communication devices, which may include functionality to capture and transmit global positioning system (GPS)

data, other location indicating data, or user input location data to generate location content for sharing.

In some exemplary embodiments, an event scheduler application may be implemented as an information sharing application associated with a place. A place that implements an event scheduler may be associated with a real world location or landmark, and content shared by the event scheduler application may include the identities of individuals located at the landmark, the identities of individuals having an event scheduled at the landmark, and/or other information associated with the events scheduled at the landmark. The event scheduler application may be associated with a place to allow the scheduled event information to be shared amongst members of the place as content. In this regard, members of the place may have defined an activity or event, where the event includes parameters for time and location (e.g., latitude/longitude or the like). In some exemplary embodiments, the location may be a user defined location that has been named and shared with other users. Examples of such a user defined location may include, "Joe's House," "the coffee shop," "the movies," or the like. Other parameters that may be included in an event may be the user's name, a type for the landmark, an associated web address, and/or other information in the form of text, audio, and/or video. The user defined event may also include other information, in addition to time and location, such as, seating information for the event, menu information, general notes, or the like. An event scheduling application may also incorporate location sharing in association with the event, which may be used together as content for sharing information within a place.

The example places of FIG. 1 are illustrated in association with various exemplary information sharing applications. Place 1 is associated with a chat room application, a file sharing application, and a screen sharing application. Place 2 is associated with a location sharing application and a messaging service application. Place 3 is associated with a event scheduler application, and Place 4 is associated with a collaborative document editing application.

Data associated with a place may be used to derive tags associated with the place. Tags may be portions of data that may be analyzed relative to an individual's user attributes to determine the relevancy of the place with respect to the individual. In some exemplary embodiments, information directly associated with a place may be used to derive tags. For example, topics or subtopics (e.g., sports, finances, stocks, bonds, etc.) associated with a place may be used to derive tags. Further, the membership of a place may be used to derive tags. In this regard, user attributes of the other members of a place, the data used to derive the user attributes of other members of the place, and/or statuses of the members may be used to derive tags for the place.

In some exemplary embodiments, tags may be derived from the content of the information being shared at the place via the information sharing applications. For example, the content of text messages being exchanged in a chat room may be used to derive tags. In this regard, key terms from a predefined list may be compared to the text messages or other content to identify tags. Similarly, frequently used terms or phrases in the content may be used to derive tags. In the same regard, the audio or video of a voice or video conference may be analyzed to derive tags. Further, the content of a document being collaboratively edited, or specifically the edits being made, may be used to derive tags. In some exemplary embodiments, the content being shared via the information sharing applications may include or be associated with metadata. The metadata may also be used to derive tags for the place.

Referring again to FIG. 1, User 1's user attributes may be analyzed relative to the tags derived from data associated with Place 1, Place 2, Place 3, and Place 4 to determine a respective relevance value for each of Place 1, Place 2, Place 3, and Place 4. The analysis may involve comparing the user attributes of User 1 to the tags to identify matches. The number of matches identified between the tags of a place and the user attributes may be used to determine the resultant relevancy value for the place. In some embodiments, the algorithms, formulas, or relationships that may be used to determine the relevancy value based on the number of matches may be, for example, a linear proportionality relationship, an exponential proportionality relationship, or other non linear relationship.

Since the information being shared at the place, the membership of the place, and/or the data associated with the place may be dynamic with respect to time, the tags associated with a place may also change with time. In this regard, a tag may be associated with a time stamp or other indication of time of creation. As such, in some embodiments, the relevancy value may be determined with respect to a predefined time value or a duration described by a start time value and an end time value. For example, a relevancy value may be determined with respect to tags that have been identified over the last hour to determine the relevancy of the place over the last hour. In some exemplary embodiments of the present invention, the predetermined time value may be an instantaneous time value, which would result in the relevancy value being determined with respect to only the tags that are currently being identified.

Figure 2A:
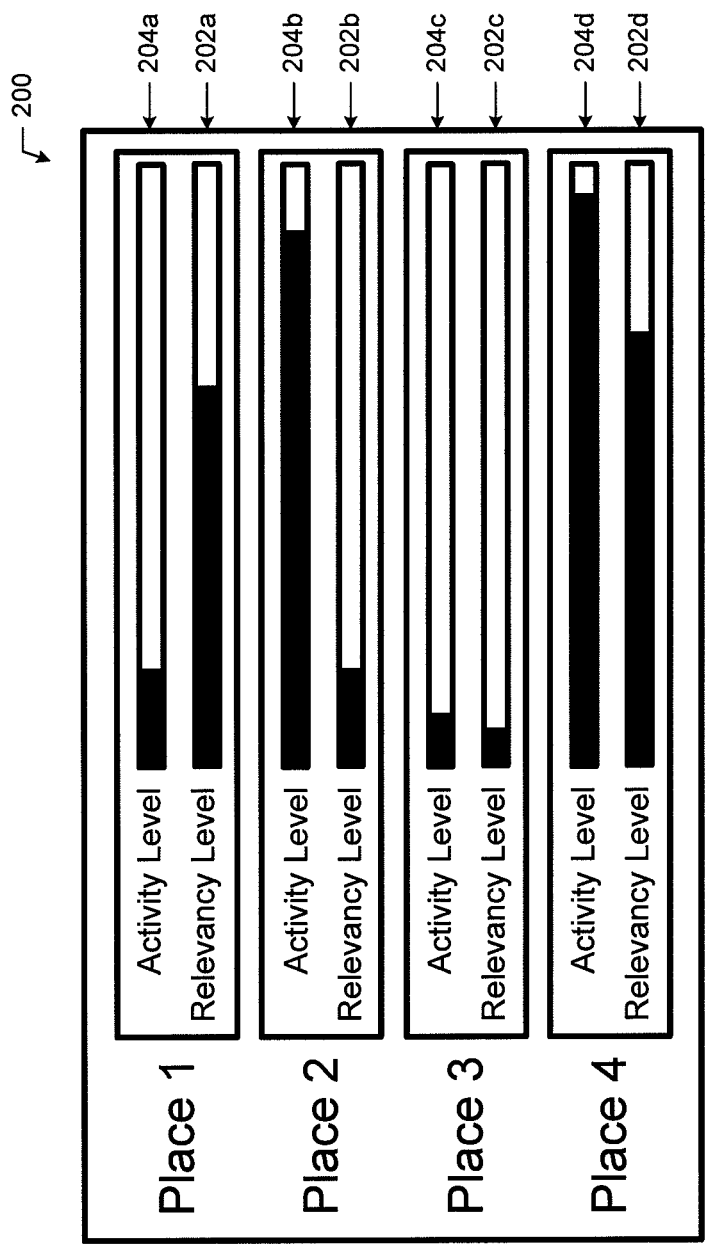
FIG. 2a illustrates an example presentation of relevance values associated with the places of FIG. 1 according to exemplary embodiments of the present invention.

FIG. 2a illustrates an example presentation of relevance values associated with the example places of FIG. 1 according to exemplary embodiments of the present invention. The presentation 200 of FIG. 2a may be provided by a display of a communications device. The presentation 200 may allow a user to quickly and efficiently review the relevance of the activities that have occurred at each place to assist the user in determining the user's actions with respect to the place (e.g., join in the information sharing at the place, change a status of the user, etc.). The presentation 200 includes representations of the relevance values 202 (e.g., 202a, 202b, 202c, and 202d) associated with respective places. The representations of the relevance values are depicted using bar charts, however, various other representations of relevancy values are contemplated such as, but not limited to, numeric indications, line graphs, dial-type indicators, or the like. In some exemplary embodiments, these representations of relevance values may be combined with or replaced by a threshold relevance level indicator. In this regard, exemplary embodiments of the present invention may be configured to implement the threshold relevance level indicator, which may cause a visual or audible response when the relevance value exceeds a predetermined threshold.

The presentation 200 of FIG. 2a also includes representations of activity values 204 (e.g., 204a, 204b, 204c, and 204d) for each respective place. An activity value of a place may be determined based on the activity occurring at the place. For example, a place having twenty members, ten of which are involved in a chat room discussion, and fifteen of which are currently involved in a collaborative document editing session (note that five members are participating in both), may have a high activity level relative to a place with two members that are sharing an audio file. Since tag generation may occur more frequently when increasing levels of information are being shared or when new members are changing statuses, the number of newly identified tags may be used to determine the activity value. Similar to the relevance value, the activity value may be determined over a period of time defined by a predetermined time value. The predetermined time value for the activity value may be equal to the predetermined time value for the relevance value. Also, similar to the representations of the relevance value, the representations of the activity values are depicted using bar charts. However, various other representations of activity values are contemplated such as, but not limited to, numeric indications, line graphs, dial-type indicators, or the like. In some exemplary embodiments, these representations of activity values may be combined with or replaced by a threshold activity level indicator. The threshold activity level indicator may cause a visual or audible response when the activity value exceeds a predetermined threshold.

Figure 2B:
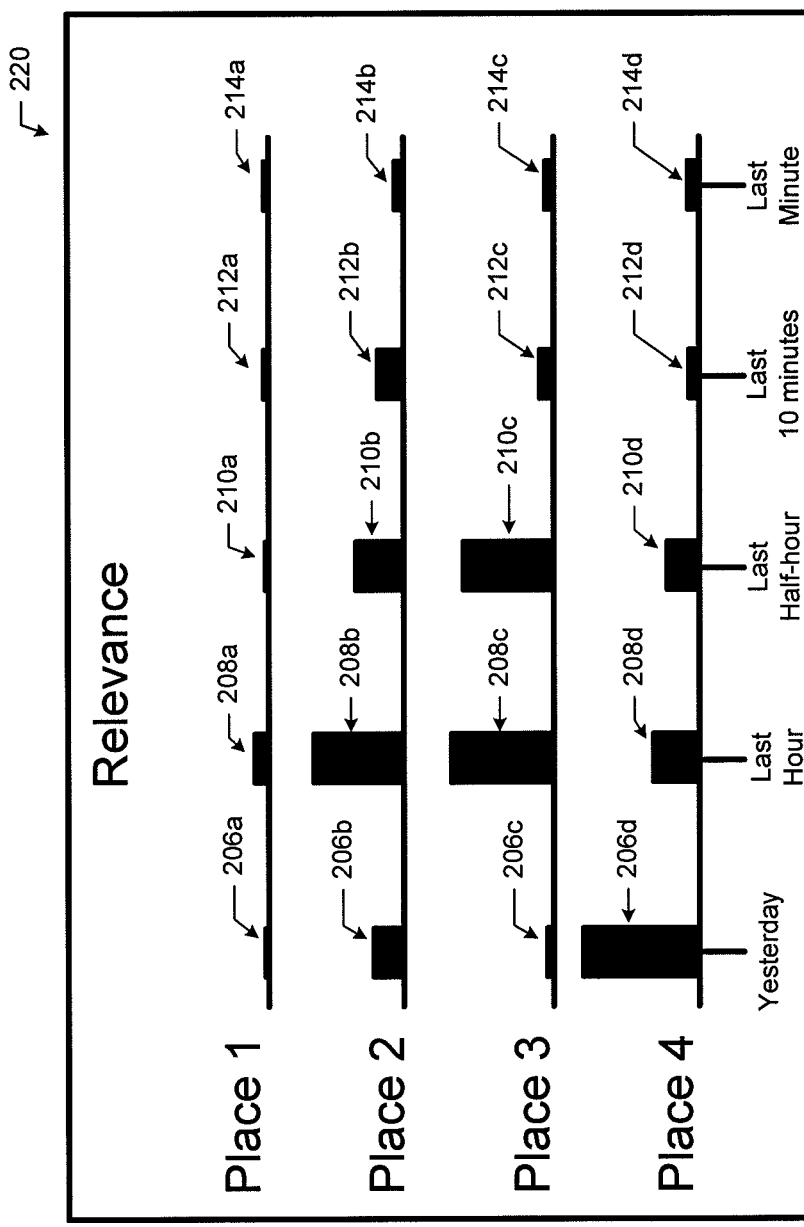
FIG. 2b illustrates an example presentation of relevance values associated with the places of FIG. 1 based on time values according to exemplary embodiments of the present invention.

FIG. 2b illustrates an example presentation 220 of relevance values associated with the places of FIG. 1 based on time values according to exemplary embodiments of the present invention. In this regard, FIG. 2 includes presentations of multiple relevancy values that have been determined with respect to a predetermined time value or values. The time stamps or other indications of time of creation may be analyzed to determine which tags were created within a time period described by the predetermined time value or values. For example, presentations of relevance values 206 (e.g., 206a, 206b, 206c, and 206d) have been determined with respect to a relative time period, namely yesterday. As such, all of the tags that were generated during the day earlier were identified and analyzed with respect to User 1's user attributes to determine a relevance value for each place. Similarly, presentations of relevance values 208 (e.g., 208a, 208b, 208c, and 208d) have been determined with respect to the tags identified at the places of FIG. 1 over the last hour. Further, presentations of relevance values 210 (e.g., 210a, 210b, 210c, and 210d) have been determined with respect to the tags identified at the places over the last half-hour; presentations of relevance values 212 (e.g., 212a, 212b, 212c, and 212d) have been determined with respect to the tags identified at the places over the last ten minutes since the last period; and presentations of relevance values 214 (e.g., 214a, 214b, 214c, and 214d) have been determined with respect to the tags identified at the places over the last minute. The representations of the relevance values 206, 208, 210, 212, and 214 are depicted using bar charts. However, various other representations of relevance values are contemplated such as, but not limited to, numeric indications, line graphs, dial-type indicators, or the like.

Figure 2C:
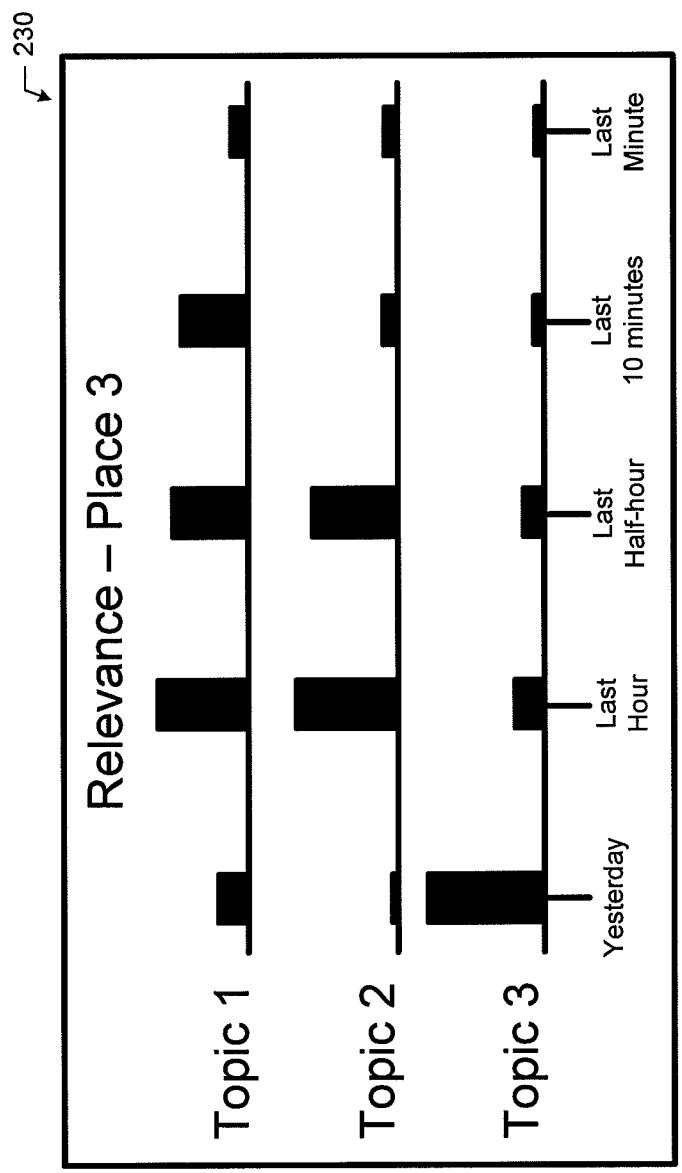
FIG. 2c illustrates an example presentation of relevance values based on topics associated with example Place 3 of FIG. 1 according to exemplary embodiments of the present invention.

FIG. 2c illustrates an example presentation 230 of relevance values based on topics associated with Place 3 of FIG. 1 according to exemplary embodiments of the present invention. The presentation 230 of FIG. 2c may be provided by a display of a communications device. The presentation 230 may allow a user to quickly and efficiently review the relevance of the activities, by topic, that have occurred at each place to assist the user in determining the user's actions with respect to the place (e.g., join in the information sharing at the place, change a status of the user, etc.). In this regard, topics may be predetermined with respect to the place or determined based on user attributes of a member (e.g., User 1 of FIG. 1). For example, a user may be part of a work group for a project that has an associated place, and the user may be a member of the place. However, the user may be responsible for only portions of the project. The portions of the project may be described with respect to topics (e.g., product development, testing, manufacturing, customer feedback, etc.). The topics may be derived from the user attributes of the user or the topics may be directly defined by the user.

To determine a relevance value for a topic, tags may be derived as being associated with the topic. In some embodiments, a predetermined keyword list may be generated that associates keywords with a topic. In this regard, if the tag includes or is otherwise associated with a key word, then the tag may be associated with the respective topic. The tags associated with a topic may be analyzed and/or counted to determine a relevance value for the topic. Further, in some embodiments, the relevancy value associated with a topic may be determined with respect to a predefined time value or values as described above.

Referring again to FIG. 2c, representations of relevance values for Topic 1, Topic 2, Topic 3, and Topic 4 are illustrated. The presentation 230 includes representations of the relevance values associated with the topics associated with example Place 3 of FIG. 1. The representations of the relevance values associated with topics are depicted using bar charts, however, various other representations of relevancy values associated with topics are contemplated such as, but not limited to, numeric indications, line graphs, dial-type indicators, or the like. In some exemplary embodiments, the representations of relevance values associated with topics may be combined with or replaced by a threshold relevance level indicator for each respective value. The threshold relevance level indicator may cause a visual or audible response when the relevance value exceeds a predetermined threshold.

Figure 3:
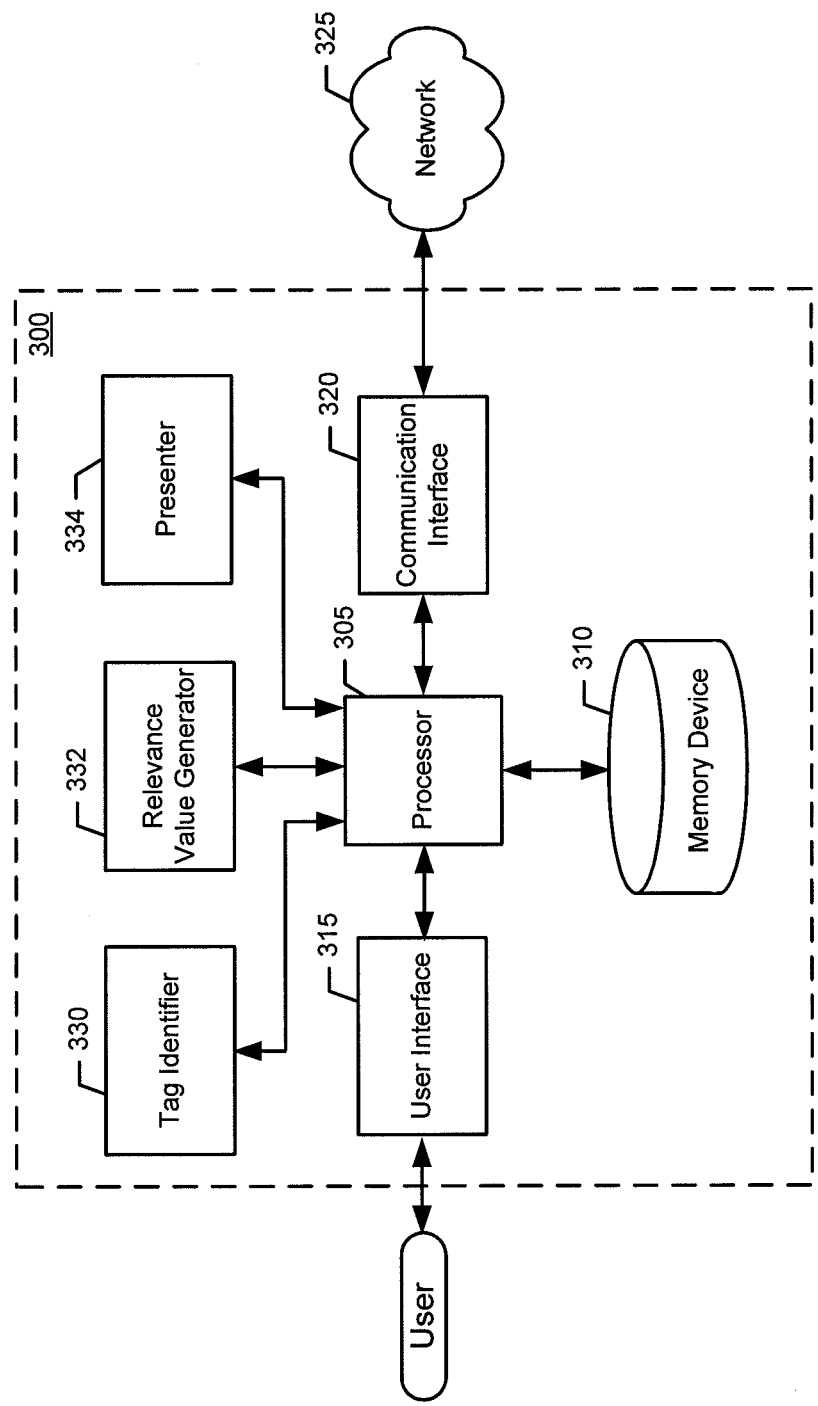
FIG. 3 illustrates an apparatus configured to provide for relevance indication according to exemplary embodiments of the present invention.

Additional exemplary embodiments of the present invention will now be described with respect to FIGS. 3 and 4. FIG. 3 illustrates an exemplary apparatus 300 that may provide a relevance indication. According to various exemplary embodiments of the present invention, the apparatus 300 may be embodied as, or included as a component of, any type of wired or wireless communications device, such as, for example, a mobile terminal such as, a mobile telephone, a portable digital assistant (PDA), a pager, a mobile television, a gaming device, a mobile computer, a laptop computer, a camera, a video recorder, an audio/video player, a radio, and/or a global positioning system (GPS) device, an access point such as a base station, or any combination of the aforementioned, or the like. Further, the apparatus 300 may be configured to implement various aspects of the present invention as described herein including, for example, various exemplary methods of the present invention, where the methods may be implemented by means of a hardware or software configured processor, computer-readable medium, or the like.

The apparatus 300 may include or otherwise be in communication with a processor 305, a memory device 310, and a communication interface 320. In some embodiments, the apparatus 300 may also include a user interface 315. The processor 305 may be embodied as various means including, for example, a microprocessor, a coprocessor, a controller, or various other processing devices including integrated circuits such as, for example, an ASIC (application specific integrated circuit), an FPGA (field programmable gate array), or a hardware accelerator. In an exemplary embodiment, the processor 305 may be configured to execute instructions stored in the memory device 310 or instructions otherwise accessible to the processor 305. Processor 305 may also be configured to facilitate communications via the communications interface 320 by, for example, controlling hardware and/or software included in the communications interface 320.

The memory device 310 may be a computer-readable storage medium that may include volatile and/or non-volatile memory. For example, memory device 310 may include Random Access Memory (RAM) including dynamic and/or static RAM, on-chip or off-chip cache memory, and/or the like. Further, memory device 310 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 310 may include a cache area for temporary storage of data. In this regard, some or all of memory device 310 may be included within the processor 305.

Further, the memory device 310 may be configured to store information, data, applications, computer-readable program code instructions, or the like for enabling the processor 305 and the apparatus 300 to carry out various functions in accordance with exemplary embodiments of the present invention. For example, the memory device 310 could be configured to buffer input data for processing by the processor 305. Additionally, or alternatively, the memory device 310 may be configured to store instructions for execution by the processor 305.

The communication interface 320 may be any device or means embodied in either hardware, software, or a combination of hardware and software that is configured to receive and/or transmit data from/to a network and/or any other device or module in communication with the apparatus 300. In this regard, the communication interface 320 may include, for example, an antenna, a transmitter, a receiver, a transceiver and/or supporting hardware, including a processor or software for enabling communications with network 325, which may be any type of wired or wireless network. Via the communication interface 320 and the network 325, the apparatus 300 may communicate with various other network entities. In this regard, network 325 may include an access point.

The communications interface 320 may be configured to provide for communications in accordance with any wired or wireless communication standard. For example, communications interface 320 may be configured to provide for communications in accordance with second-generation (2G) wireless communication protocols IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 320 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like.

The user interface 315 may be in communication with the processor 305 to receive user input at the user interface 315 and/or to provide output to a user as, for example, audible, visual, mechanical or other output indications. The user interface 315 may include, for example, a keyboard, a mouse, a joystick, a display (e.g., a touch screen display), a microphone, a speaker, or other input/output mechanisms. In some exemplary embodiments, such as when apparatus 300 is embodied as a server, the user interface 315 may be limited, or even eliminated.

Tag identifier 330, relevance value generator 332, and presenter 334 of apparatus 300 may be any means or device embodied in hardware, software, or a combination of hardware and software, such as processor 305 implementing software instructions or a hardware configured processor 305, that is configured to carry out the functions of tag identifier 330, relevance value generator 332, and/or presenter 334 as described herein. In an exemplary embodiment, the processor 305 may include, or otherwise control the tag identifier 330, relevance value generator 332, and/or presenter 334. In various exemplary embodiments, the tag identifier 330, relevance value generator 332, and/or presenter 334 may reside on differing apparatuses such that some or all of the functionality of the tag identifier 330, relevance value generator 332, and/or presenter 334, may be performed by a first apparatus, and the remainder of the functionality of the tag identifier 330, relevance value generator 332, and/or presenter 334 may be performed by one or more other apparatuses.

The tag identifier 330 of apparatus 300 may be configured to identify tags associated with a place. In this regard, the tag identifier 330 may monitor the place, and in particular the activities (e.g., information sharing), information regarding the individuals participating the activities (e.g., statuses), and the content of the activities to derive tags as described above. The tag identifier 330 may be configured to identify tags associated with an activity that is an information sharing application associated with a place. Further in this regard, the tag identifier 330 may be configured to identify tags derived from content shared via an information sharing application implemented in association with the place. Additionally, or alternatively, in some exemplary embodiments, the tag identifier 330 may be configured to identify tags derived from metadata associated with content shared via an information sharing application implemented in association with the place.

In some embodiments, the tag identifier 330 may be configured to identify tags by receiving tags that have been derived or otherwise identified by another entity, such as, a monitoring server that has access to the place and the data associated with the place. The tag identifier 330 may receive the tags via the communications interface 320 and the network 325.

The relevance value generator 332 may be configured to determine a relevance value by analyzing the tags associated with a place relative to user attributes. In this regard, in some exemplary embodiments, the relevance value generator 332 may derive user attributes based on a user's profile, other predefined user preferences, a history log, and/or as otherwise described above. For example, some user attributes may be indicative of real world locations that the user has recently visited. In some exemplary embodiments, the relevance value generator 332 may be configured to determine matches of tags to user attributes and track the number of matches to determine the relevance value. For example, a match may result if a user attribute for a project title the user is working on matches with a tag referring to the same topic from a chat room. Further, for example, a user attribute for a recently visited location may be a match with tag for the same location associated with a place, or a similar real world location such as a similar type of restaurants, or a similar type of tourist attraction. In some exemplary embodiments, tags may be associated with a topic as described above, and the relevance value generator 332 may be configured to determine a relevance value with respect to a topic.

In some exemplary embodiments, the relevance value generator 332 may be configured to receive a time value (e.g., yesterday, last hour, etc.) or values (e.g., start time value, end time value) and determine the relevance value with respect to the time value or values. In this regard, the relevance value generator 332 may be configured to analyze the tags that have time stamps or other indications of time of creation that fit within the duration described by the time value or values.

In some exemplary embodiments, the relevance value generator 332 may be also configured to determine an activity value. In this regard, the activity value may be indicative of the amount of activity associated with a place. In some exemplary embodiments, the relevance value generator 332 may be configured to analyze a number of recently generated tags to derive the activity value.

The presenter 334 of apparatus 300 may be configured to provide for an output of a representation of the relevance value. In some exemplary embodiments, the presenter 334 may be configured to provide for an output of the representation of the relevance value to a user interface. In some exemplary embodiments, the user interface may include a display, and the presenter 334 may be configured to provide for an output of a relevance value by transmitting a representation of the relevance value to circuitry the drives the display. The presenter 334 may be configured to provide for outputting the relevance value to a user interface of apparatus 300, such as user interface 315. In some exemplary embodiments, the presenter 334 may be configured to provide for outputting the representation of the relevance value to a user interface that is remote to apparatus 300 via the communication interface 320 and the network 325.

The presenter 334 may also be configured to provide for an output of a representation of an activity value. In some exemplary embodiments, the presenter 334 may be configured to provide for an output of a representation of an activity value to a user interface. In this regard, the presenter 334 may be configured to provide for outputting the representation of the activity value to a user interface of apparatus 300, such as user interface 315. In some exemplary embodiments, the presenter 334 may be configured to provide for outputting the activity value to a user interface that is remote to apparatus 300 via the communication interface 320 and the network 325.

Figure 4:
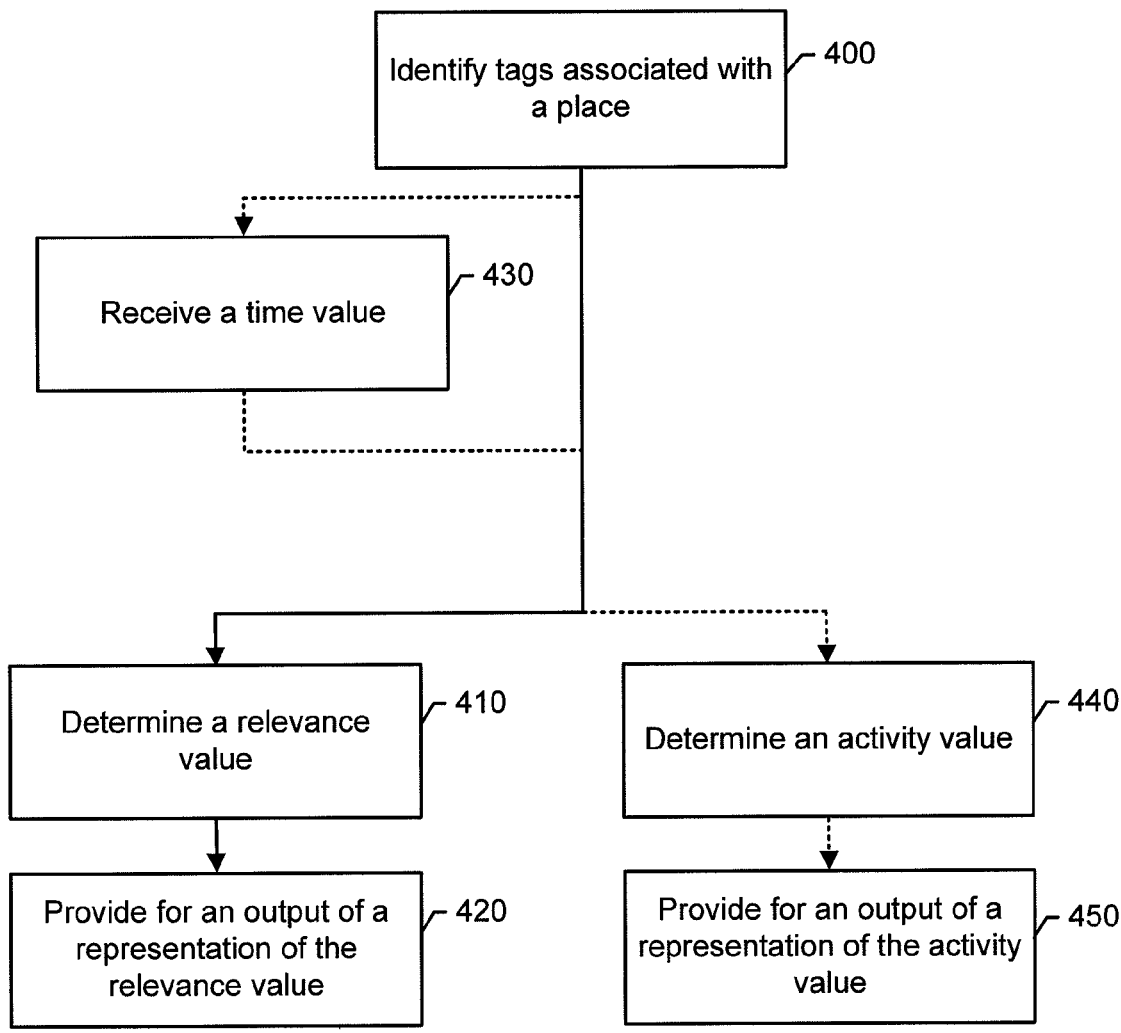
FIG. 4 illustrates a method for relevance indication according to exemplary embodiments of the present invention.

FIG. 4 illustrates a flowchart of a system, method, and computer program product according to exemplary embodiments of the invention. It will be understood that each block, step, or operation of the flowchart, and/or combinations of blocks, steps, or operations in the flowchart, can be implemented by various means. Means for implementing the blocks, steps, or operations of the flowchart, and/or combinations of the blocks, steps or operations in the flowchart may include hardware, firmware, and/or software including one or more computer program code instructions, program instructions, or executable computer-readable program code instructions. In one exemplary embodiment, one or more of the procedures described herein may be embodied by program code instructions. In this regard, the program code instructions which embody the procedures described herein may be stored by or on a memory device, such as memory device 310, of an apparatus, such as apparatus 300, and executed by a processor, such as the processor 305. As will be appreciated, any such program code instructions may be loaded onto a computer or other programmable apparatus (e.g., processor 305, memory device 310) to produce a machine, such that the instructions which execute on the computer or other programmable apparatus create means for implementing the functions specified in the flowchart's block(s), step(s), or operation(s). These program code instructions may also be stored in a computer-readable storage medium that can direct a computer, a processor, or other programmable apparatus to function in a particular manner, such that the instructions stored in the computer-readable storage medium produce an article of manufacture including instruction means which implement the function specified in the flowchart's block(s), step(s), or operation(s). The program code instructions may also be loaded onto a computer, processor, or other programmable apparatus to cause a series of operational steps to be performed on or by the computer, processor, or other programmable apparatus to produce a computer-implemented process such that the instructions which execute on the computer, processor, or other programmable apparatus provide steps for implementing the functions specified in the flowchart's block(s), step(s), or operation(s).

Accordingly, blocks, steps, or operations of the flowchart support combinations of means for performing the specified functions, combinations of steps for performing the specified functions, and program code instruction means for performing the specified functions. It will also be understood that one or more blocks, steps, or operations of the flowchart, and combinations of blocks, steps, or operations in the flowchart, can be implemented by special purpose hardware-based computer systems which perform the specified functions or steps, or combinations of special purpose hardware and program code instructions.

FIG. 4 illustrates a flowchart describing an exemplary method of the present invention for providing relevance indication. The exemplary method may include identifying tags associated with a place at 400. In some embodiments, the exemplary method may include identifying tags derived from content shared via an information sharing application, such as, for example, a text messaging application or other information sharing applications described above. Further, in some embodiments, the exemplary method may additionally, or alternatively, include identifying tags derived from metadata associated with the content shared via an information sharing application. In some exemplary embodiments, the place may be associated with a real world location or landmark, and identifying the tags associated with the place at 400 may include identifying tags being derived from user defined events associated with the real world place or landmark.

At 410, the exemplary method may include determining a relevance value for the place by analyzing the tags relative to user attributes. In some exemplary embodiments, determining the relevance value at 410 may include determining the relevance value with respect to a topic. Further, in some exemplary embodiments, the user attributes may be derived from a user profile, user defined preferences, and/or a history log of a user's actions.

At 420, the exemplary method may include providing for an output of a representation of the relevance value. In some embodiments, the relevance value may be output to a user interface. Moreover, in some embodiments, the relevance value may be output to a display included by the user interface.

In some embodiments, the exemplary method may include receiving a time value or values at 430. In this regard, determining the relevance value at 410 may include determining the relevance value based on the time value or values.

Further, in some embodiments, the exemplary method may include determining an activity value at 440. In this regard, the activity value may be indicative of an amount of activity associated with a place. Additionally, at 450, the exemplary method may include providing for an output of a representation of the activity value. In some embodiments, the activity value may be output to a user interface. Moreover, in some embodiments, the activity value may be output to a display included by the user interface.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A computer implemented method comprising:
   identifying tags associated with a place, the place being a virtual location where information is shared;
   determining a relevance value for the place by analyzing the tags relative to user attributes, wherein a number of matches identified between the tags of a place and the user attributes are used to determine the relevance value for the place, wherein algorithms, formulas, or relationships used to determine the relevance value are based on a number of matches having a linear proportionality relationship, an exponential relationship, or a non-linear relationship;
   determining an activity value indicative of an amount of activity associated with the place based, at least in part, on a number of newly identified tags determined over a period of time defined by a pre-determined time value; and
   providing for an output to a user interface, wherein the output comprises a listing of the place and a representation of a level of the relevance value and a representation of a level of the activity value associated with the place.

2. The method of claim 1, wherein determining the relevance value includes determining the relevance value with respect to a topic and the representation of the level of the relevance value is a numeric indication.

3. The method of claim 1, wherein the tags are derived from content shared via an information sharing application configured to share the content amongst members of the place.

4. The method of claim 3, wherein the tags are derived from metadata associated with the content.

5. The method of claim 3, wherein the information sharing application is a text messaging application.

6. The method of claim 1, wherein the place is associated with a real world location and the tags are derived from user defined events.

7. The method of claim 1 further comprising:
   receiving a time value, wherein the determination of the relevance value is based, at least in part, on the time value.

8. The method of claim 1, wherein the user attributes are derived from user defined preferences.

9. The method of claim 1, wherein the user attributes are derived from a history log of a user's actions.

10. An apparatus comprising:
    at least one processor; and
    at least one memory including computer program code for one or more programs,
    the at least one memory and the computer program code configured to, with the at least one processor, cause the apparatus to perform at least the following,
      identify tags associated with a place, the place being a virtual location where information is shared;
      determine a relevance value for the place by analyzing the tags relative to user attributes, wherein a number of matches identified between the tags of a place and the user attributes are used to determine the relevance value for the place, wherein algorithms, formulas, or relationships used to determine the relevance value are based on a number of matches having a linear proportionality relationship, an exponential relationship, or a non-linear relationship;
      determine an activity value indicative of an amount of activity associated with the place based, at least in part, on a number of newly identified tags determined over a period of time defined by a pre-determined time value; and
      provide for an output to a user interface, wherein the output comprises a listing of the place and a representation of a level of the relevance value and a representation of a level of the activity value associated with the place.

11. The apparatus of claim 10, wherein the processor is configured to determine the relevance value with respect to a topic and the output presents the listing and the representation as separate graphical elements.

12. The apparatus of claim 10, wherein the processor is configured to identify tags derived from content shared via an information sharing application implemented in association with the place, wherein the information sharing application is configured to share the content amongst members of the place.

13. The apparatus of claim 12, wherein the tags are derived from metadata associated with the content.

14. The apparatus of claim 12, wherein the information sharing application is a text messaging application.

15. The apparatus of claim 10, wherein the place is associated with a real world location and the tags are derived from user defined events.

16. The apparatus of claim 10, wherein the processor is further configured to receive a time value; and wherein the processor is configured to determine the relevance value based on the time value.

17. The apparatus of claim 10, wherein the processor is configured to determine the relevance value for the place by analyzing the tags relative to the user attributes, the user attributes being derived from a user profile.

18. The apparatus of claim 10, wherein the processor is configured to determine the relevance value for the place by analyzing the tags relative to the user attributes, the user attributes being derived from a history log of a user's actions.

19. The apparatus of claim 10 further comprising the user interface, wherein the user interface includes a display, and wherein the processor configured to provide for the output of the representation of the relevance value includes being configured to provide for the output by transmitting the representation of the relevance value to circuitry that drives the display.

20. A non-transitory computer-readable storage medium including one or more sequences of one or more instructions which, when executed by one or more processors, cause an apparatus to at least perform the following steps:

identify tags associated with a place, the place being a virtual location where information is shared;

determine a relevance value for the place by analyzing the tags relative to user attributes, wherein a number of matches identified between the tags of a place and the user attributes are used to determine the relevance value for the place, wherein algorithms, formulas, or relationships used to determine the relevance value are based on a number of matches having a linear proportionality relationship, an exponential relationship, or a non-linear relationship;

determine an activity value indicative of an amount of activity associated with the place based, at least in part, on a number of newly identified tags determined over a period of time defined by a pre-determined time value; and provide for an output to a user interface of the apparatus, wherein the output comprises a listing of the place and a representation of a level of the relevance value and a representation of a level of the activity level associated with the place.

21. The non-transitory computer-readable storage medium of claim 20, wherein the relevance value is determined, at least in part, with respect to a topic.

22. The non-transitory computer-readable storage medium of claim 20, wherein the tags are derived, at least in part, from content shared via an information sharing application that is implemented in association with the place, wherein the information sharing application is configured to share the content amongst members of the place.

23. The non-transitory computer-readable storage medium of claim 22, wherein the tags are associated, at least in part, with the content shared via the information sharing application, the tags being derived from metadata associated with the content.

24. The non-transitory computer-readable storage medium of claim 20, wherein the tags are associated, at least in part, with an information sharing application, the information sharing application being a text messaging application.

25. The non-transitory computer-readable storage medium of claim 20, wherein the tags are associated, at least in part, with the place, the place being associated with a real world location and the tags being derived from user defined events.

26. The non-transitory computer-readable storage medium of claim 20, wherein the apparatus is caused to further perform the following:

receive a time value, wherein the relevance value is determined, at least in part, based on the time value.

27. The non-transitory computer-readable storage medium of claim 20, wherein the relevance value is determined, at least in part, by analyzing the tags relative to the user attributes, the user attributes being derived from a user profile.

28. The non-transitory computer-readable storage medium of claim 20, wherein the relevance value is determined, at least in part, by analyzing the tags relative to the user attributes, the user attributes being derived from a history log of a user's actions.

29. An apparatus, comprising:

means for identifying tags associated with a place, the place being a virtual location where information is shared;

means for determining a relevance value for the place by analyzing the tags relative to user attributes, wherein a number of matches identified between the tags of a place and the user attributes are used to determine the relevance value for the place, wherein algorithms, formulas, or relationships used to determine the relevance value are based on a number of matches having a linear proportionality relationship, an exponential relationship, or a non-linear relationship;

means for determining an activity value indicative of an amount of activity associated with the place based, at least in part, on a number of newly identified tags determined over a period of time defined by a pre-determined time value; and means for providing for an output to a user interface, wherein the output comprises a listing of the place and a representation of a level of the relevance value and a representation of a level of the activity level associated with the place.

* * * * *